UNITED STATES PATENT OFFICE.

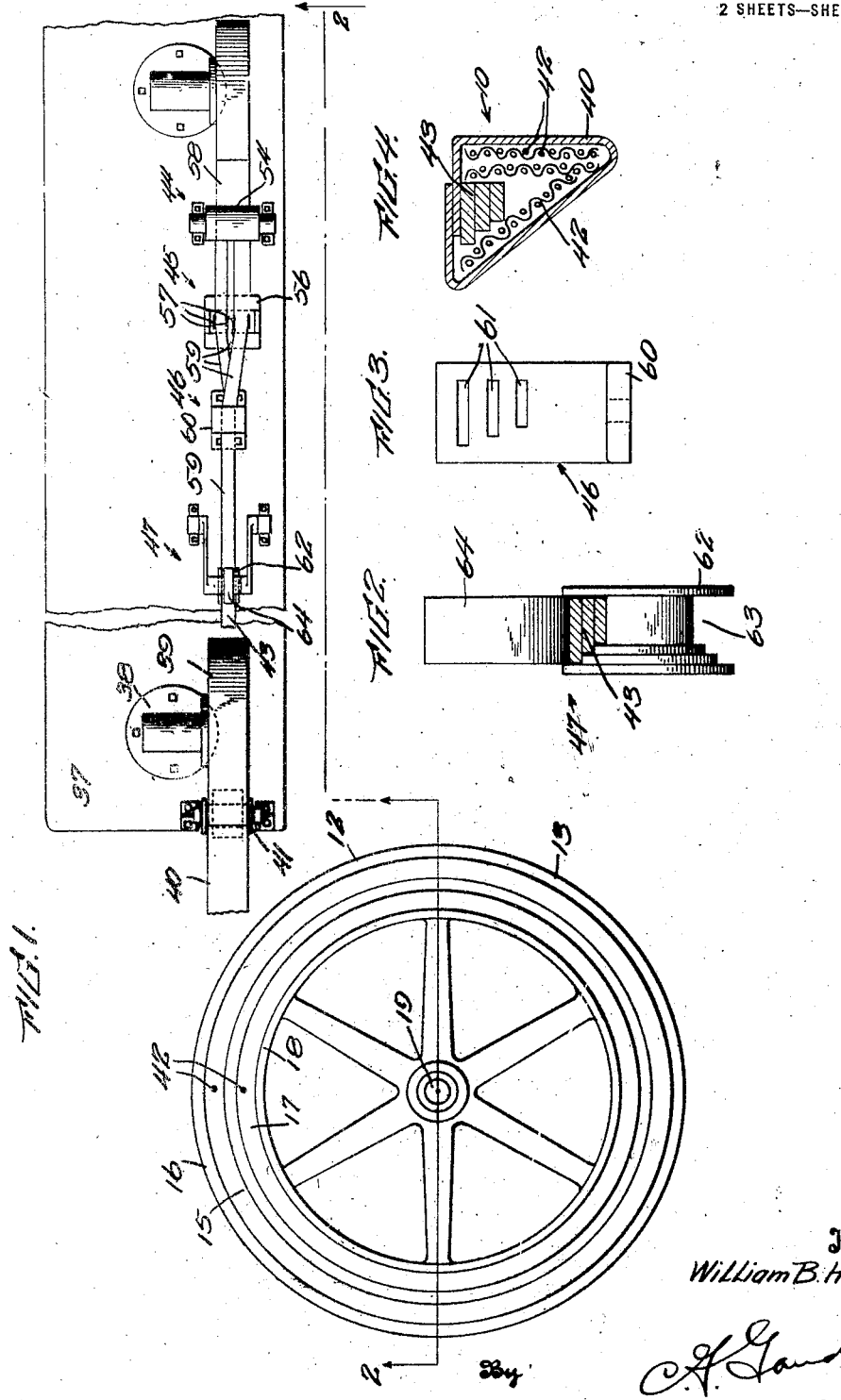

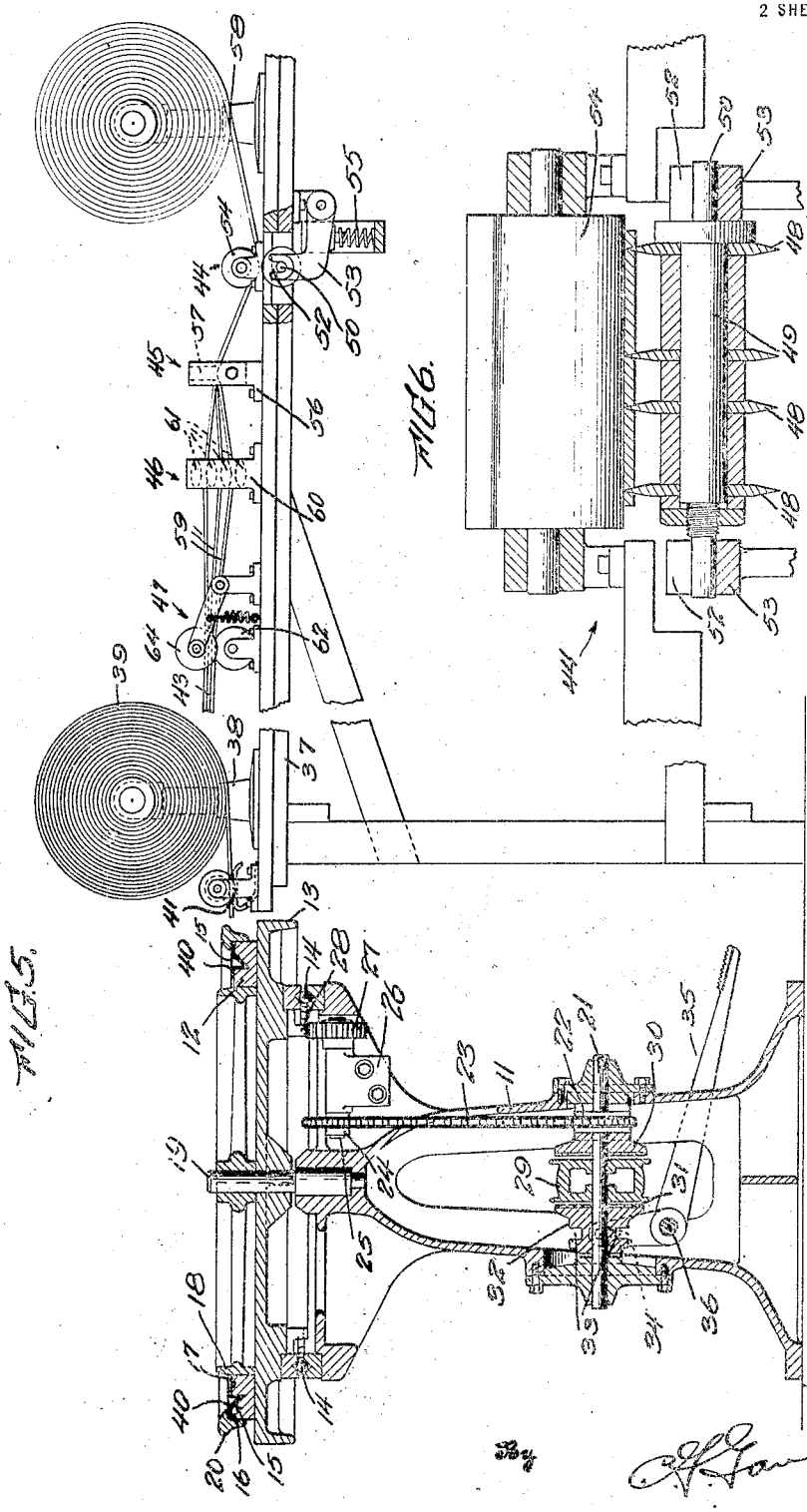

WILLIAM B. HARSEL, OF AKRON, OHIO, ASSIGNOR TO THE GOODYEAR TIRE & RUBBER COMPANY, OF AKRON, OHIO, A CORPORATION OF OHIO.

APPARATUS FOR MAKING TIRE BEADS.

1,406,855.   Specification of Letters Patent.   Patented Feb. 14, 1922.

Application filed November 8, 1918. Serial No. 261,687.

*To all whom it may concern:*

Be it known that I, WILLIAM B. HARSEL, a citizen of the United States, residing at Akron, in the county of Summit and State of Ohio, have invented new and useful Improvements in Apparatus for Making Tire Beads, of which the following is a specification.

My present invention relates to forming bead cores for pneumatic tires.

Heretofore these cores have been constructed by the use of a former, and the operations involved in assembling the bead core elements and forming the bead core have been performed manually.

As a principal object, my invention contemplates utilizing a rotatable former on which the fabric covering can be easily and quickly placed; the metal reinforcing elements and the fabric filler can be laid in the fabric covering; and the side portions of the covering fabric can then be folded and stitched in place; the former being rotated at will to facilitate assembling the bead core elements and stitching the fabric covering of the bead core.

My invention also has in view the provision of means for pre-forming the fabric filler strip which is used as one of the elements in the structure of the bead core.

The above and additional objects of a similar nature, which will be hereinafter more specifically disclosed, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which similar reference numbers designate corresponding parts:

Figure 1 is a plan view showing the machine for making the bead core, and also showing the means for forming the fabric filler strip;

Figure 2 is a cross-sectional view of the fabric strip pressing rolls;

Figure 3 is a sectional view of the means for forming the fabric filler strip;

Figure 4 is an enlarged cross-sectional view of the bead core;

Figure 5 is a sectional view of the machine for making the bead core, taken on the line 2—2 of Figure 1; and Figure 6 is a sectional view of the fabric cutting device.

The machine for forming the bead core 10 preferably comprises a stand or pedestal 11 on which is rotatably mounted a bead core form 12. As shown, the form 12 is removable and preferably disposed on a table or platform 13 which is mounted on a ball bearing raceway 14 arranged between the table 13 and the stand 11. A vertical arbor 19 is secured to the table 13 and fitted rotatably in a socket in the upper part of the stand 11.

The form 12 preferably has an annular body, provided in the upper part thereof with a groove 15, a flat surface 16 extending between its outer periphery and the groove 15, a flat surface 17 which extends between the groove 15 and an upstanding shoulder 18 at the inner periphery of the form 12; the surface 17 being wider than the surface 16. A clamping ring 20 is removably mounted on the form 12 and adapted to bear on the surface 16.

Rotation of the table 13 may be effected by any suitable means, that shown comprising a driving shaft 21 which has thereon a sprocket wheel 22 connected by a chain 23 to a sprocket wheel 24 on a shaft 25, which is mounted in a bearing bracket 26 secured to the stand 11, and which shaft has thereon a spur wheel 27 in mesh with teeth 28 on the under side of the table 13.

The operation of the driving shaft 21 may be controlled by any suitable means, that shown comprising a driving pulley 29 loosely mounted on the shaft 21 and disposed between a friction disk 30 on the hub of the sprocket wheel 22, and a friction disk 31 on a sleeve 32 loosely mounted on the shaft 21 and provided with a groove 33 into which extend projections 34 carried in a forked portion of an angular foot lever 35 which is mounted on a pivot 36 bearing in the lower part of the stand 11.

Adjacent to the table 13 is arranged a platform 37 which has thereon a stand 38 for a roll of fabric 39 suited for the fabric covering 40 of the bead core 10. The fabric 39 passes through a guide 41 arranged on the platform 37 and then passes tangentially onto the form 12. If the fabric covering 40 is rubber treated, it can be connected by adhesion of its tacky surface to the form 12, otherwise it can be attached to pointed projections 65 on the form. In the operation of the bead core machine, the clamping ring 20 is removed from the form 12; then the end of the fabric covering 40 is connected to the form 12; and placed on the form—with its inner edge following and abutting against the shoulder 18—by effecting rotation of the form 12 by causing, through pressure on the foot lever 35, frictional engagement of the pulley 29 with the friction disks 30 and 31.

When one ply of the fabric covering 40 has been laid on the form 12, the latter is stopped from rotation by release of the foot lever 35, and the fabric covering on the form is severed from that connected to the roll 39. The clamping ring 20 is then placed on the form 12 to hold the outer edge portion of the fabric covering 40 on the surface 16. Next the fabric covering is partially drawn off of the surface 17 and rolled in contact with the walls in the groove 15—the connections between the foot lever 35 and the table 13 permitting the form 12 to be rotated at the desired slow speed. Next, piano wire rings, braided wire, wire netting, or other suitable metal stiffening and re-inforcing element 42 is placed in the covering fabric 40 in the groove 15. A filler strip 43 of fabric is next pressed into the groove 15 against the metal re-inforcing element 42; and the portion of the fabric covering on the surface 17 is folded over and stitched or pressed on the elements in the groove 15. Lastly the clamping ring 20 is removed and the remaining portion of the fabric covering 40 is folded over and stitched or pressed onto the portions of the covering fabric that was folded over from the surface 17.

In folding over and stitching the side portions of the fabric covering 40, suitable hand tools may be used and the form 12 may be rotated at the desired speed to facilitate the operations. The operative connections for rotating the table 13 permit of the form 12 being rotated in either direction by hand—this being a very desirable feature in a machine of this class.

As shown in this instance, the means for forming the fabric filler strip 43 is mounted on the platform 37 and comprises a fabric-cutting or scoring device 44, a device 45 for separating the cut or scored fabric into strips, a device 46 for aligning the strips, and friction rollers 47 for pressing the aligned strips together to form the multiple ply filler strip 43.

The cutting or scoring device 44 preferably consists of annular blades 48 slipped on an enlarged portion 49 of a shaft 50 and spaced apart to the desired extent by collars 51 on the shaft 50. The shaft 50 is removably mounted in slots 52 of arms 53, and the blades 48 are yieldably pressed against a roller 54 by means of springs 55 adapted to press against the arms 53. The separating device 45 preferably consists of a base or stand 56 having thereon upstanding blades 57 between which the cut or scored fabric 58 is drawn to separate the fabric into strips 59. The aligning device 46 preferably consists of a stand 60 provided with a vertical tier of guide openings 61 through which the separate strips 59 pass to the form 12. The device 47 preferably consists of a roller 62 provided with a peripheral groove 63 through which the aligned strips 59 pass and in passing are pressed by a roller 64 to form the completed filler strip 43. When, as in this instance, the strips 59 are of different widths, the groove 63 is formed stepped and the portions of the groove which accommodate the wider strips 59 are at the outer portion of the groove.

In operation, the rubberized fabric 58, the supply of which may be from the usual stock roll, is passed through the cutting or scoring device 44 and thence through the devices 45, 46 and 47, to form the filler strip 43. By manually pulling on, or attaching to the rotating form 12, an already formed piece of the filler strip 43, the fabric 58 can be drawn through the devices 44, 45, 46 and 47 and thus the filler strip can be formed as it is needed for use.

What I claim is:

1. A machine for building a bead core, comprising a power driven rotatable table, a removable bead form mounted concentrically thereon to rotate therewith, and lever actuated means for controlling the rotation of said table.

2. A machine for building a bead core, comprising, a support, a power driven rotatable table mounted thereon, a removable bead forming ring concentrically mounted upon said table and designed to rotate therewith, and treadle operable devices for controlling the rotation of said table.

3. A machine for building a bead core, comprising a rotatably supported table, a removable bead forming ring mounted concentrically thereon to rotate therewith, and a clutch controlled drive for rotating said table.

4. A machine for building a bead core, comprising a horizontally disposed form, provided on its upper face with an annular bead shaping groove, a clamping ring removably mounted on the form, and means for effecting rotation of the form.

5. A machine for building a bead core, comprising a horizontally disposed rotatable annular form provided with an annular bead shaping groove in its upper face and an upstanding shoulder at its inner periphery for the purpose set forth.

6. A machine for building a bead core, comprising a rotatable annular form provided with an annular bead shaping groove in its upper face and an upstanding shoulder in its inner periphery, and a clamping ring removably mounted at the outer periphery of the form.

7. A machine for building a bead core, having a rotatable annular form provided with a groove and substantially flat surfaces extending between the groove and the inner and outer peripheries of the form, an upstanding shoulder at the inner periphery of the form, and a removably mounted clamping ring at the outer periphery of the form.

8. A machine for building a bead core, comprising the combination of a horizontally disposed bead form provided with an annular bead shaping groove in its upper face, and means to effect rotation of the form, said means including a shaft, a pulley loosely mounted on the shaft, a friction disk rigidly mounted on the shaft and operatively connected to the form, and a friction disk slidable on the shaft to frictionally engage and move the pulley into frictional engagement with the first mentioned friction disk.

9. A machine for building a bead core, having means for forming a fabric filler strip, said means comprising devices for cutting the fabric into strips, a device for aligning the strips, and a device for pressing the aligned strips together to form the filler strip.

10. The combination of means for building up a laminated fabric filler strip, and a rotatably mounted form for building a bead core, said means being operable through connection of the filler strip to the form whereby said strip is laminated prior to the core building operation.

11. In a machine for forming a bead core, the combination with mechanism for forming a laminated filler strip, of a support for a reel of covering fabric associated with said mechanism, a rotatable forming table having removably mounted thereon a female die member, and lever controlled driving devices for rotating said table and die to actuate said strip forming mechanism and to selectively pull said covering fabric and said strip onto the die, in position to be formed thereon.

12. In a machine for forming a bead core, the combination with mechanism for forming a laminated fabric strip, of a support for a reel of covering fabric associated with said mechanism, a rotatable forming table having removably mounted thereon a female die member, lever controlled driving devices for rotating said die to actuate said strip forming mechanism and to selectively pull said covering fabric and said strip onto the die in position to be formed thereon, means for clamping the covering fabric onto the die, and devices for guiding the covering fabric and strip tangentially onto said die.

13. The method of forming a bead core which comprises, shaping a fabric strip into an annulus while said strip is being rotated in a horizontal plane, forming a channel in the upper face thereof, filling in the channel, and folding and pressing the peripheral edges of the annulus over the channeled portion thereof while said annulus is being rotated.

14. The method of forming a bead core which comprises, shaping a fabric strip into an annulus while said strip is being rotated in a horizontal plane, securing one peripheral edge of the annulus against distortion under rotation, forming a filler strip through rotative action of the annulus and simultaneously feeding said strip tangentially onto said annulus, releasing the secured edge of the annulus, and folding and pressing together the edge portions of the annulus to enclose the filler.

15. The method of forming a bead core which comprises, shaping a fabric strip into annular form while said strip is being rotated in a horizontal plane, forming a channel along the median line of the strip in the upper face thereof, forming a filler strip through rotative action of the annulus and simultaneously feeding the filler strip into the channel, and folding and pressing together the peripheral edge portions of the annulus to enclose the filler strip.

16. The method of forming a bead core which comprises, shaping a fabric strip into an annulus while said strip is being rotated in a horizontal plane, securing one peripheral edge of the annulus against distortion under rotation, forming a channel along the median line of the annulus in the upper face thereof, forming a filler strip through rotative action of the annulus and simultaneously feeding said strip tangentially onto said annulus, releasing the secured edge of the annulus, and folding and pressing together the edge portions of the annulus to enclose the filler.

17. The method of forming a bead core which comprises, shaping a strip of fabric into annular form while said strip is being rotated in a horizontal plane, forming a filler strip through rotative action of the annulus, simultaneously feeding said strip unto the annulus at a tangent thereto, and folding and pressing together the peripheral edges of the strip to enclose said filler.

In witness whereof, I have hereunto signed my name in the presence of two subscribing witnesses.

WILLIAM B. HARSEL.

Witnesses:
R. S. TROGNER,
E. C. LEADENHAM.